Dec. 9, 1969     R. P. REESE     3,482,856
TRAILER HITCH
Filed Aug. 26, 1968     2 Sheets-Sheet 1
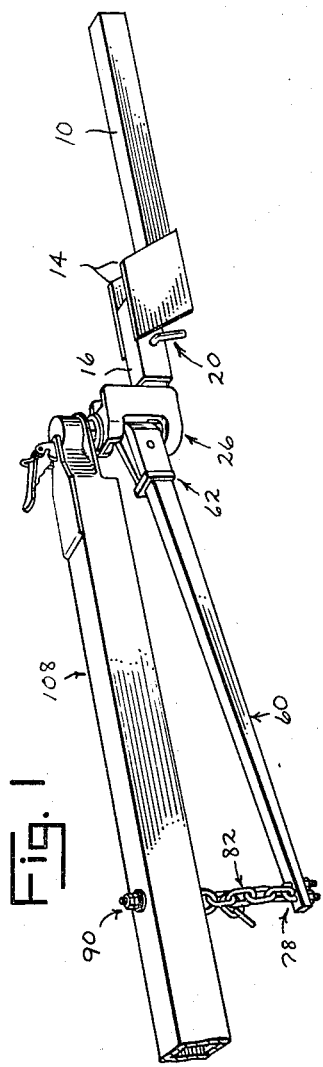
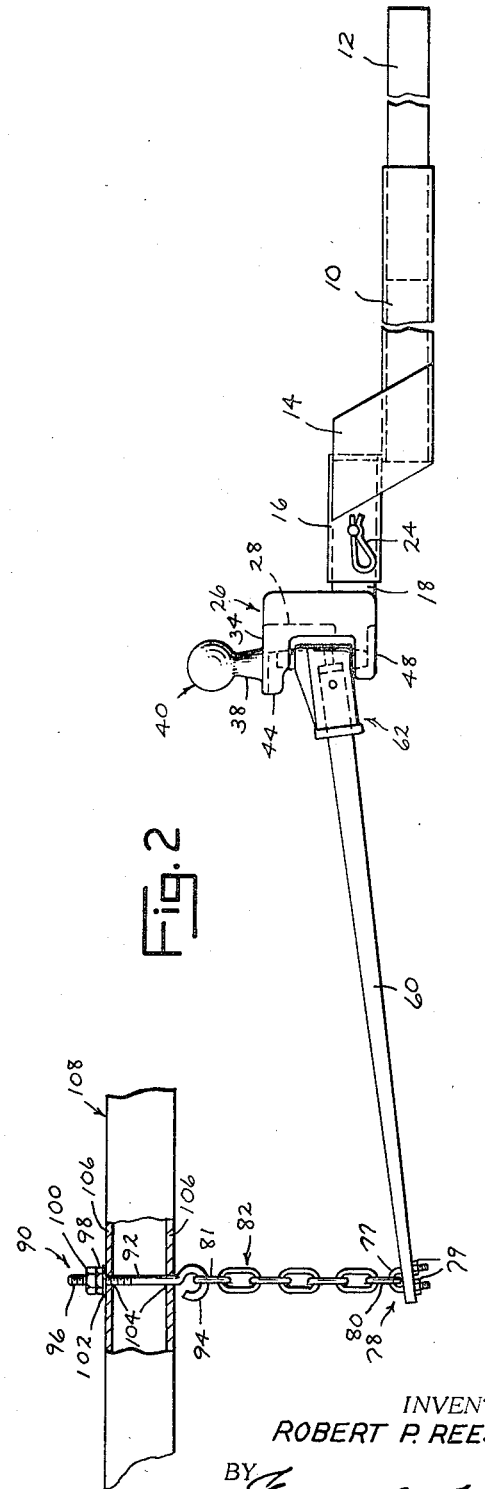
INVENTOR.
ROBERT P. REESE
BY Eugene C. Knoblock
ATTORNEY

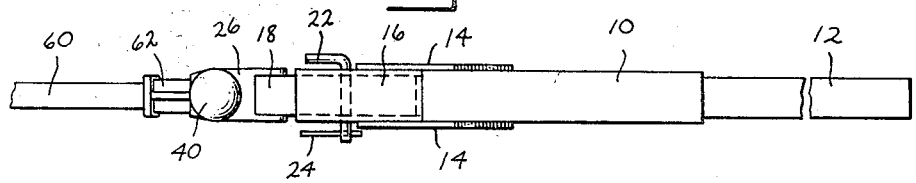
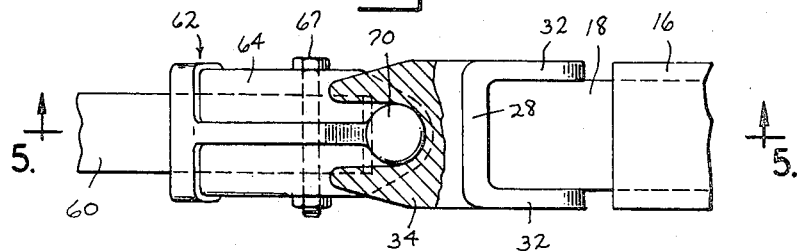
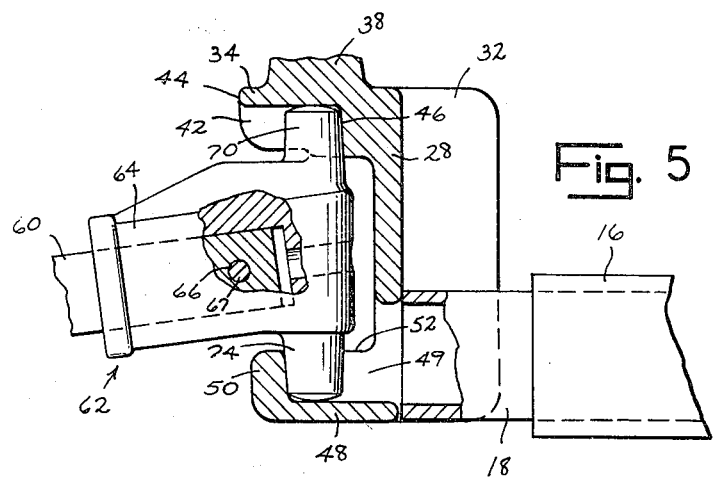
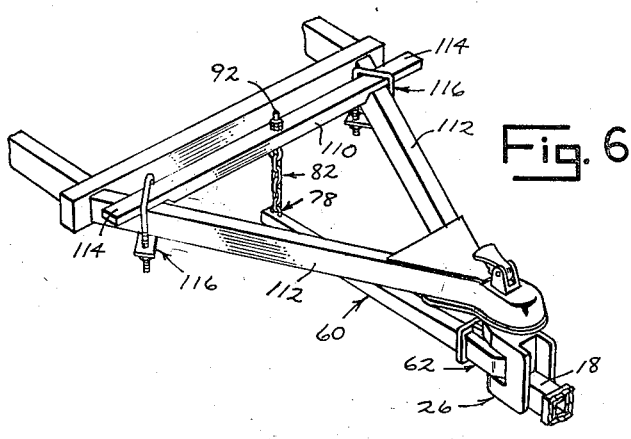

United States Patent Office 3,482,856
Patented Dec. 9, 1969

3,482,856
TRAILER HITCH
Robert P. Reese, Osolo Township, Elkhart County, Ind., assignor to Reese Products, Inc., Elkhart, Ind., a corporation of Indiana
Filed Aug. 26, 1968, Ser. No. 755,169
Int. Cl. B62d 53/06; B60d 1/06, 7/00
U.S. Cl. 280—406                     4 Claims

ABSTRACT OF THE DISCLOSURE

A trailer hitch including an elongated rigid unit adapted to be mounted to the frame of a towing vehicle and having a hitch ball bracket. An elongated cantilever spring bar has one end detachably pivoted about a substantially vertical axis to the hitch ball bracket. A flexible suspension means is connected to the free end of the spring bar and engages a spring adjustment means which is adapted for mounting to the frame of a trailer.

SUMMARY OF THE INVENTION

This invention relates to a load transferring trailer hitch for lightweight trailers and includes an elongated rigid unit adapted to be mounted to the frame of a towing vehicle and including a hitch ball bracket. An elongated cantilever spring bar is detachably pivoted at one end to the hitch ball bracket about a substantially vertical axis. Flexible suspension means are connected to the free end of the spring bar and spring adjustment means which are adapted for mounting to the frame of a trailer are detachably connected to the flexible suspension means.

Heretofore, load transferring trailer hitches, such as those described in U.S. Patents 2,952,475 and 2,898,124, have not provided satisfactory operation for those trailers, such as boat, utility and animal trailers, having hitch weights up to 300 pounds. It was found that the prior art load transferring hitches were too expensive or did not possess desired properties of ready and rapid attachment and detachment together with ability to transfer a portion of the trailer tongue load to the towing vehicle.

The trailer hitch of this invention is of a construction that effectively transfers a part of the load of the trailer to the frame of the towing vehicle and serves to distribute the hitch load to both front and rear wheels of the towing vehicle as well as to the trailer wheels. The trailer may be coupled to the hitch and the hitch adjusted to distribute the hitch load in a matter of minutes and with only minimal physical exertion on the part of the hitch user. When the hitch is not being used, the spring bar may be removed from the hitch ball bracket without the need of tools, the hitch ball bracket detached from the remainder of the hitch unit and both parts conveniently stored.

Accordingly, it is an object of this invention to provide a trailer hitch for light duty trailers which serves to transmit and distribute in desired manner a part of the load from the trailer to the front and rear wheels of the towing vehicle.

A further object of this invention is to provide a load transferring hitch for light duty trailers which permits rapid coupling of the trailer to the towing vehicle.

Still another object of this invention is to provide a load transferring hitch for light duty trailers having parts which can be rapidly disconnected from the hitch unit and conveniently stored when the hitch is not in use.

Other objects of this invention will become apparent upon a reading of the invention's description.

BRIEF DESCRIPTION OF THE DRAWINGS

FIG. 1 is a perspective view of one embodiment of the trailer hitch of this invention shown connected to one type of a trailer frame.

FIG. 2 is a view of the trailer hitch shown in FIG. 1 in side elevation with the free end of the spring bar attached to a portion of the trailer frame.

FIG. 3 is a fragmentary top plan view of the trailer hitch of FIG. 2.

FIG. 4 is an enlarged fragmentary detail top plan view of the hitch bracket of the trailer hitch shown in FIG. 1, with parts broken away.

FIG. 5 is a fragmentary enlarged side view of the hitch bracket shown in FIG. 4 with the parts thereof shown in section as viewed along line 5—5 of FIG. 4.

FIG. 6 is a perspective view of another embodiment of the trailer hitch of this invention shown connected to another type of trailer frame.

DESCRIPTION OF THE PREFERRED EMBODIMENTS

The preferred embodiments illustrated are not intended to be exhaustive or to limit the invention to the precise forms disclosed. They are chosen and described in order to best explain the principles of the invention and their application and practical use to thereby enable others skilled in the art to best utilize the invention.

In FIGS. 1–3, the numeral 10 designates an elongated rigid tubular member which is preferably of square or other non-circular cross sectional shape. Member 10 telescopically mounts or receives a tube or bar 12 of suitable length and strength. Members 10 and 12 constitute parts of a carrier which are adapted to be secured at longitudinally spaced points to the frame or chassis of a towing motor vehicle, such as an automobile or truck, in fixed relation thereto and in such a manner, well known in the art, so as to transmit a load acting upon the free or outer end of the carrier to the motor vehicle frame at longitudinally spaced points thereof. If desired, members 10 and 12 may be secured in selected longitudinal adjustment one within the other and each may be fixed by connection thereof to the towing vehicle by suitable securing means at selected points thereof. In the form shown in FIGS. 1–3, the carrier tube 10 mounts a pair of spaced laterally projecting brackets or plates 14 to which are fixedly secured in an offset and preferably parallel relation to tube 10, a rigid tube 16. Tube 16 projects beyond the end of tube 10 and is of preferably square or other non-circular cross section.

A rigid elongated bar 18 has a snug telescopic fit in tube 16 and is provided with one or more transverse apertures therein which register with apertures in the opposed walls of tube 16. A pin or other securing member 20, preferably of L-shape so as to provide a laterally projecting handle 22 at one end thereof, is received within said registering apertures in tube 16 and bar 18. Pin 20 is preferably apertured at its end opposite handle 22 to receive a resilient retainer member 24. A hitch ball bracket 26 is welded or otherwise fixedly secured to the outer or free end of bar 18 and preferably projects vertically upwardly relative thereto. The hitch ball bracket 26 is preferably an integral metal casting and includes a vertical transverse front wall 28 reinforced by forwardly projecting spaced symmetrically positioned parallel vertical flanges 32. The spacing between inner faces of flanges 32 is preferably substantially equal to the width of bar 18. The free end of bar 18 is positioned between flanges 32 at selected elevation and may abut the lowermost part of wall 28, being secured to the bracket in any convenient manner, such as by welding.

Bracket 26 includes an integral top wall 34 which extends rearwardly from wall 28 and which has a central portion fixedly supporting the shank 38 of a king pin or hitch ball 40. The axis of king pin 40 preferably intersects the axis of bar 18 and the axes of tubes 10 and 16. The king pin may be integral with the bracket or of separate construction and mounted, as by bolting, to wall 34 of the hitch bracket. Top wall 34 is provided at the bottom face thereof with an elongated extending slot 42 open at the rear edge 44 of said wall 34 and terminating at an abutment shoulder 46 preferably spaced rearwardly from front wall 28. Slot 42 is preferably positioned symmetrically about the plane of the axes of king pin 40 and bar 18.

Bracket 26 includes an integral bottom wall 48 having a socket 49 formed therein which is in vertically spaced relation below slot 42 in top wall 34 and which is defined in part by an outer upwardly projecting wall part 50 and spaced parallel upwardly projecting side parts 52 of bottom wall 48. The lower portion of front wall 28 is preferably cut away at socket 49, as best shown in FIG. 5, so that socket 49 opens forwardly between flanges 32.

An elongated spring unit of the cantilever type is detachably and pivotally carried by the hitch ball bracket 26. This cantilever spring unit includes an elongated spring steel bar 60 which is normally straight and may be of any selected configuration, such as a longitudinally tapered shape as best illustrated in FIG. 2. Spring bar 60 is secured to a rigid carrier 62. Carrier 62 includes a socket portion 64 which is preferably elongated and tubular. Socket portion 64 has a bore of a cross section similar to and of a size to snugly and non-rotatively receive the front end portion of the spring bar 60. The length of the portion of the spring bar which fits within socket portion 64 preferably is substantially greater than the cross sectional dimension of the spring bar. The front end portion of each spring bar 60 fitting within socket portion 64 has a transverse aperture 66 which registers with apertures in socket portion 64 to receive a pin or other anchoring member 67 which preferably is detachably or removably mounted in the apertures and which may be a nut and a bolt.

Spring carrier 62 includes an upwardly projecting cylindrical pin portion 70 and a downwardly projecting pin portion 74. Projecting pin portions 70 and 74 are preferably coaxial with the axis thereof preferably extending at an acute angle to the axis of the socket portion 64, as shown in FIG. 5, and intersecting the axis of spring bar 60. Pin portion 70 has a diameter which is preferably substantially equal to the width of slot 42 in top wall 34 and pin portion 74 has a diameter preferably substantially equal to the spacing between side parts 52 of socket 49 in bottom wall 48. Pin portions 70 and 74 are received within slot 42 and socket 49 respectively and constitute hinge pins which permit lateral pivotal movement of the cantilever spring unit with respect to hitch ball bracket 26 on an axis substantially aligned with the center of the king pin 40. It will be observed that with the cantilever spring unit pivotally connected to the hitch ball bracket 26 and with an upward force exerted upon the free end of spring bar 60, pin portion 70 abuts shoulder 46 of top wall 34 and pin portion 74 abuts end part 50 of bottom wall 48 of the hitch ball bracket. The cantilever spring unit can be installed within bracket 26 without the use of any securing means or tools and can likewise be rapidly removed from the bracket. Removal of the cantilever spring unit is accomplished by tilting the unit counterclockwise, as viewed in FIG. 2, so as to permit the withdraw of pin portion 70 from slot 42 whereupon pin portion 74 can be lifted from its receiving socket 49. Installation of the cantilever spring unit may be accomplished in a reverse manner.

The free end of a spring bar 60 carries a suitable retainer 78 which pivotally mounts an end link 80 of a multiple link chain 82. Retainer 78 may consist of a U-bolt 77 having its threaded end portions inserted through apertures in the end of spring bar 60 and secured therein by engaging nuts 79. The opposite end of chain 82 is releasably connected to a spring adjustment member 90. Spring adjustment member 90 may include a support part 92 having a lower return bent or hook-shaped end portion 94 and an upper integral threaded shank portion 96, an adjustment nut 98, a retainer nut 100, and a washer 102. The hook-shaped end portion 94 of adjustment member part 92 engages a selected link 81 of chain 82. With chain 82 so connected to part 92, the shank portion 96 of part 92 is adapted to extend upwardly through registering apertures 104 formed substantially midwidth of the upper and lower webs 106 of a tubular frame member 108 of the straight trailer tongue partially shown in FIG. 1. Apertures 104 in frame member 108 of the trailer are positioned substantially vertically spaced above retainer 78 at the free end of spring bar 60. The shank 96 of adjustment member part 92 projects upwardly from upper web 106 of frame member 108 and receives washer 102, adjustment nut 98 and retainer nut 100.

To tension spring bar 60 and thereby distribute the hitch load between the trailer and towing vehicle, adjustment nut 96 may be turned by a suitable means, such as a wrench, causing adjustment member part 92 to be drawn upwardly to lift the free end of the bar. When the desired level between the frame of the towing vehicle and the frame of the trailer is reached, retainer nut 100 may be tightened against adjustment nut 98 to prevent loosening thereof. To disengage the trailer from the towing vehicle, chain 82 may be slackened by loosening retainer nut 100 and adjustment nut 98 so as to release the tension in spring bar 60. Connector pin 20 is then withdrawn from bar 18 and tube 16 to permit separation of bracket 26 from tube 16 which is rigidly connected to the frame of the towing vehicle.

FIG. 6 illustrates a trailer hitch of this invention adapted for attachment to an A-frame type trailer. The construction of the hitch previously described above and illustrated by FIGS. 1–5 is modified to include a cross bar or support member 110 which is adapted to be positioned laterally of and carried by diverging tubular frame members 112 of the trailer frame. Cross bar member 110 is preferably tubular having reduced end portions 114 which engage laterally opposite parts of the diverging frame members 112. Cross bar member 110 is secured to frame members 112 by suitable clamp means 116, such as the U-bolts and nut-secured retainer plates illustrated in FIG. 6. Cross bar member 110 has registering vertically aligned apertures therein which are formed substantially midlength of member 110 at the center line of the trailer. Shank 96 of adjustment member part 92 is received within the registering apertures in cross bar member 110 and is secured therein by adjustment nut 98 and retainer nut 100 in the same manner as that before described in attaching adjustment member part 92 to the frame member 108 of the straight-tongue type trailer. The manner of operation and adjustment of the modified hitch shown in FIG. 6 is essentially the same as that previously described for the hitch shown in FIGS. 1–5.

What I claim is:

1. A trailer hitch comprising an elongated rigid unit adapted to be mounted to the frame of a towing vehicle and including a bracket mounting a hitch ball, an elongated cantilever spring bar having one end detachably pivoted about a substantially vertical axis to said bracket below said hitch ball, said bracket having a front wall and rearwardly projecting top and bottom walls, said hitch ball carried by and projecting above said top wall, said top wall having a slot in the lower surface thereof and said bottom wall having a socket in the upper surface thereof, said spring bar carrying at one end thereof a pair of rigid coaxial upper and lower pivot pins releasably seating in said slot and socket respectively, said top wall including an abutment part engaging said upper pivot pin, said bottom wall including an abutment part engaging said lower pivot pin, the axes of said hitch ball and pivot pins intersecting the axes of said spring bar and rigid unit, flexible suspension means connected to the free end of said spring bar, and spring adjustment means adapted for mounting to the frame of a trailer and including means for detachable connection with said suspension means, said front wall having a cutout in the lower portion thereof which communicates with said socket.

2. The trailer frame hitch of claim 1, wherein said hitch ball is integral with said bracket.

3. A trailer hitch comprising an elongated rigid unit adapted to be mounted to the frame of a towing vehicle and including a bracket mounting a hitch ball, an elongated cantilever spring bar having one end detachably pivoted about a substantially vertical axis to said bracket below said hitch ball, said bracket having a front wall and rearwardly projecting top and bottom walls, said hitch ball carried by and projecting above said top wall, said top wall having a slot in the lower surface thereof and said bottom wall having a socket in the upper surface thereof, said spring bar carrying at one end thereof a pair of rigid coaxial upper and lower pivot pins releasably seating in said slot and socket respectively, said top wall including an abutment part engaging said upper pivot pin, said bottom wall including an abutment part engaging said lower pivot pin, the axes of said hitch ball and pivot pins intersecting the axes of said spring bar and rigid unit, flexible suspension means connected to the free end of said spring bar, and spring adjustment means adapted for mounting to the frame of a trailer and including means for detachable connection with said suspension means, said flexible suspension means including a chain having one end connected to said spring bar, said spring adjustment means including an anchor part adapted to be carried by the frame of said trailer and a support part having a hook-shaped end portion engaging a link of said chain and a shank portion adjustably engaging said anchor part.

4. The trailer hitch of claim 3, wherein the frame of the trailer includes laterally spaced parts, a cross bar spans said laterally spaced trailer frame parts, and means for fixedly securing said cross bar to said laterally spaced trailer frame parts, said spring adjustment means being carried by said cross bar between and spaced from said laterally spaced trailer frame parts.

References Cited

UNITED STATES PATENTS

| | | | |
|---|---|---|---|
| 2,738,206 | 3/1956 | Loughner | 280—461 |
| 2,789,834 | 4/1957 | Chism | 280—406 |
| 2,952,475 | 9/1960 | Reese | 280—406 |
| 3,185,499 | 4/1965 | Reese | 280—406 |
| 3,370,867 | 2/1968 | Berlincourt et al. | 280—406 |
| 3,343,735 | 3/1969 | Bernard | 280—406 |

LEO FRIAGLIA, Primary Examiner